United States Patent [19]
Morishita et al.

[11] Patent Number: 5,842,944
[45] Date of Patent: Dec. 1, 1998

[54] AUXILIARY MACHINE DRIVING APPARATUS

[75] Inventors: Akira Morishita; Katsumi Adachi; Ryuichi Ikeda; Kyoko Kurusu; Hideki Morikaku, all of Tokyo, Japan

[73] Assignee: Mitsubishi Denki Kabushiki Kaisha, Tokyo, Japan

[21] Appl. No.: 708,612

[22] Filed: Sep. 5, 1996

[30] Foreign Application Priority Data

Feb. 14, 1996 [JP] Japan .................................. 8-052267

[51] Int. Cl.⁶ .................................................. F02B 67/06
[52] U.S. Cl. ........................... 475/154; 475/269; 475/318
[58] Field of Search .................................. 475/149, 154, 475/155, 269, 317, 318, 331, 153

[56] References Cited

U.S. PATENT DOCUMENTS

| | | | |
|---|---|---|---|
| 2,939,343 | 6/1960 | Berklege | 475/318 X |
| 3,469,473 | 9/1969 | Hans | 475/154 X |
| 4,008,629 | 2/1977 | Hoepfl et al. | 475/269 X |
| 4,651,082 | 3/1987 | Kaneyuki | |
| 4,838,622 | 6/1989 | Kircher et al. | 475/156 X |
| 4,870,875 | 10/1989 | Morishita | 475/153 |
| 5,328,419 | 7/1994 | Motl et al. | 475/324 |
| 5,378,210 | 1/1995 | Teraoka | 475/312 |
| 5,645,148 | 7/1997 | Saurin et al. | 475/331 X |

FOREIGN PATENT DOCUMENTS

| | | |
|---|---|---|
| 64-40749 | 2/1989 | Japan . |
| 6-179333 | 6/1994 | Japan . |
| 6-58069 | 8/1994 | Japan . |

Primary Examiner—Charles A. Marmor
Assistant Examiner—Peter T. Kwon
Attorney, Agent, or Firm—Sughrue, Mion, Zinn, Macpeak & Seas, PLLC

[57] ABSTRACT

To perform the change-over smoothly between a uniform velocity mode and an acceleration mode and to relieve a shock at the time of changing-over the velocity, there are provided, in an auxiliary machine driving apparatus, a plurality of planet gears (2) rotatably supported on a carrier (21) connected to an input shaft (6), an internal gear (3) which meshes with the outer circumferences of the respective planet gears (2) and rotatably supported on a stationary portion, an electromagnetic powder brake (50) for connecting/disconnecting the internal gear (3) to/from the stationary portion, an output shaft (4) having a sun gear (41) which meshes with the inner circumferences of the respective planet gears (2) so as to be rotatably supported thereby, and a one-way clutch (8) provided between the carrier (21) and the output shaft (41).

7 Claims, 6 Drawing Sheets

AUXILIARY MACHINE DRIVING APPARATUS

BACKGROUND OF THE INVENTION

The present invention relates to an auxiliary machine driving apparatus disposed between an engine and an auxiliary machine such as an alternator or the like, in a vehicle or the like.

Generally, auxiliary machines such as a compressor, an oil pump, an alternator and so on are provided in a vehicle driven by an internal combustion engine or the like, and these auxiliary machines are driven by using the power of the internal combustion engine or the like.

FIG. 6 is a sectional view of a conventional auxiliary machine driving apparatus, for example, as disclosed in JP-B 6-58069, wherein this auxiliary machine driving apparatus 100 has a disc-like planet gear carrier 11 housed in a housing 14, and an input shaft 1 rotatably supported on the housing 14 is formed integrally on one side (right in the drawing) of this carrier 11. In addition, a plurality of arms 11a project on the other side (left in the drawing) of the carrier 11, and planet gears 2 are rotatably disposed on the arms 11a.

With respect to the input shaft 1, the aforementioned planet gears 2 mesh, at their outer circumferences, with an internal gear 3 and mesh, at their inner circumferences, with a sun gear 41. The internal gear 3 is rotatably supported at its outer circumference onto the housing 14 through bearings 13a and 13b. The sun gear 41 is formed on an output shaft 4 rotatably supported through bearings at its one end on the housing 14 and at its other end on the carrier 11 integrated with the input shaft 1. A pulley 7 for driving an auxiliary machine is attached to the output shaft 4.

A centrifugal member 12 is circumferentially provided on the outer circumference of the carrier 11 integrated with the input shaft 1, and this centrifugal member 12 projects from the carrier 11 when the rotation velocity becomes a predetermined value or more to thereby connect the carrier 11 to the internal gear 3.

In addition, an electromagnetic clutch mechanism 5 is provided at one end of the internal gear 3. This electromagnetic clutch mechanism 5 is constituted by an bevel-like spring member 5a provided in a side portion of the internal gear 3, a ring-like armature 5b fixed to a large-diameter portion of the spring member 5a, and a core 5d disposed in the position opposite to this armature 5b and having an excitation coil 5c inside thereof.

Next, the operation of the aforementioned conventional apparatus will be described.

In the auxiliary machine driving apparatus 100, the input shaft 1 is rotated by the power transmitted from an engine, so that the planet gears 2 supported by the arms 11a of the carrier 11 revolve around the sun gear 41. At that time, the internal gear 3 is held in a non-rotation state because the armature 5b is attracted onto the core 5d against the spring member 5a, so that the sun gear 41 is rotated while being accelerated relatively to the rotation of the input shaft 1. As a result, the output shaft 4 on which the sun gear 41 is formed is rotated at a high velocity. Then, when the rotation velocity of the engine becomes high, the rotation velocity of the output shaft 4 becomes high in proportion to the velocity increase ratio of the planet gear mechanism, and an excessive centrifugal force is exerted if thus increased rotation is transmitted from this output shaft 4 to the auxiliary machine or the like and bearings or the like installed therein may be broken. Therefore, as shown in FIG. 6, the centrifugal member 12 provided on the outer circumferential portion of the carrier 11 is made to protrude radially outwardly when the rotation velocity of the carrier 11 reaches a predetermined value or more, so that the carrier 11 and the internal gear 3 are connected to each other by this centrifugal member 12. In addition, a carrier rotation detecting means (not shown) detects a predetermined value of the rotation velocity, to turn off the current supply to the excitation coil 5c of the electromagnetic clutch mechanism 5 through a controller (not shown), to thereby disconnect the internal gear 3 from the housing 14. As a result, the internal gear 3 rotates together with the carrier 11, that is, together with the input shaft 1, so that the rotation velocity of the sun gear 41 becomes equal to that of the carrier 11, and the output shaft 4 becomes not-accelerated to prevent the rotation velocity of the auxiliary machine on the output side from being increased so much.

In the above-mentioned conventional apparatus thus constructed, change-over between an acceleration mode and a uniform velocity mode is not carried out smoothly, and a shock at the time when the changing-over is carried out is transmitted to the engine side through the input shaft to thereby cause a change in the rotation velocity of the engine. Accordingly, there arises a problem in drivability in a vehicle or the like.

SUMMARY OF THE INVENTION

The present invention has been achieved to solve the foregoing problems, and it is an object thereof to enable smooth change-over operation between an acceleration mode and a uniform velocity mode in an auxiliary machine driving apparatus so as to relieve a shock at the time when the changing-over is carried out.

According to an aspect of the present invention, provided is an auxiliary machine driving apparatus including a carrier (21) connected to an input shaft (6) from an engine, a plurality of planet gears (2) rotatably supported on the carrier (21), an internal gear (3) which meshes with the outer circumferences of the planet gears (2) and rotatably supported on a stationary portion (a brake body 52), a connection/disconnection means (an electromagnetic powder brake 50) for connecting/disconnecting the internal gear (3) to/from the stationary portion (the brake body 52), the means being capable of adjusting the connecting/ disconnecting force thereof, an output shaft (4) having a sun gear (41) which meshes with the inner circumferences of the planet gears (2), the output shaft (4) being rotatably supported, and a unidirectional rotation transmitting means (a one-way clutch 8) for transmitting rotations unidirectionally from the carrier (21) to the output shaft (41).

In the above apparatus, preferably, the input shaft (6) is a crank-shaft of the engine.

In the above apparatus, preferably, the connecting/ disconnecting force of the connection/disconnection means (the electromagnetic powder brake 50) is adjusted based upon both the rotation velocity of the carrier (21) and the acceleration/deceleration state of the engine. More specifically, it is preferable that the supplied value of current to an excitation coil (54) of the electromagnetic powder brake 50 is gradually increased or decreased in accordance with the detected velocity and the acceleration/deceleration state in order to adjust the force.

BRIEF DESCRIPTION OF THE DRAWINGS

FIGS. 2A and 2B are sectional views, each taken along line 2A,2B —2A,2B of FIG. 1, illustrating a unidirectional clutch mechanism, wherein FIG. 2A shows a state where a clutch is released, and FIG. 2B state where the clutch is engaged.

DETAILED DESCRIPTION OF THE PREFERRED EMBODIMENTS

Figure 1:
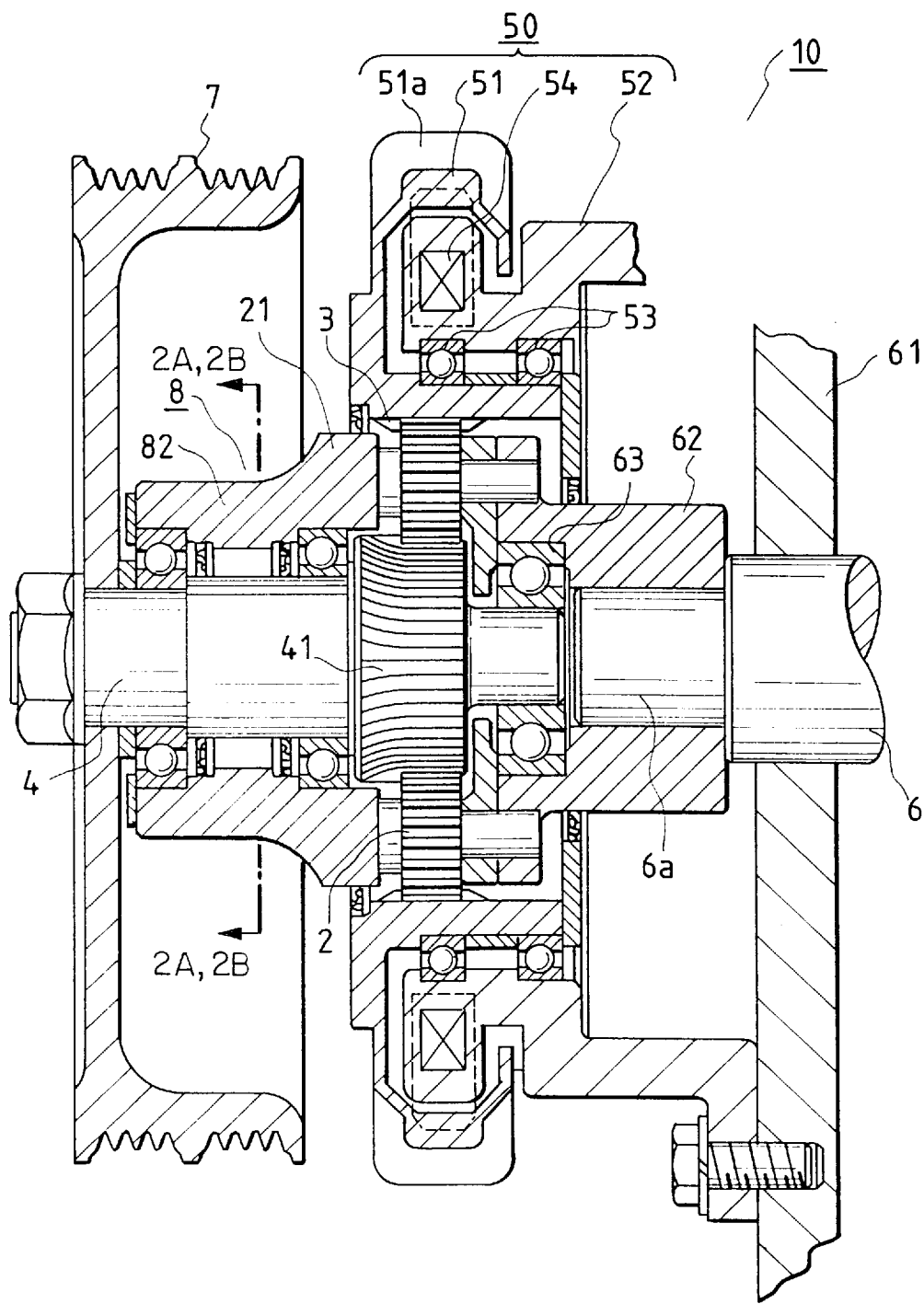
FIG. 1 is a sectional view of an auxiliary machine driving apparatus according to an embodiment 1 of the present invention.

FIG. 1 is a sectional view of an auxiliary machine driving apparatus according to a first embodiment of the present invention.

In FIG. 1, a crank-shaft of an internal combustion engine is disposed in an auxiliary machine driving apparatus 10 as an input shaft 6 of the apparatus 10. A boss 62 is integrally fixed to a step portion 6a of the input shaft (crank-shaft) 6 which projects out of an engine casing 61. In addition, a plurality of (three in this embodiment) planet gears 2, which will be described later, are rotatably supported on the left portion of the boss 62 in the drawing, and an internal gear 3 is provided on the outer circumferential side of the planet gears 2. In addition, the internal gear 3 is rotatably disposed on a brake body 52 (stationary portion) through bearings 53 so as to be rotatable relative to the boss 62 of the input shaft (crank-shaft) 6.

On the other hand, an output shaft 4 is disposed coaxially with the input shaft (crank-shaft) 6, and is rotatably supported by means of the boss 62 through bearings 63 and by means of a carrier 21, which will be described later, through bearings. In addition, a driving pulley 7 for transmitting power to an auxiliary machine such as an alternator or the like is fixed to the output side of the output shaft 4.

A one-way clutch mechanism 8, which will be described later, is provided on the right side in the drawing, of the driving pulley 7 of the output shaft 4. Further, a sun gear 41 is formed on the right portion of the output shaft 4 in the same manner as in conventional case. The above-mentioned plurality of planet gears 2 are disposed between the sun gear 41 and the internal gear 3 so as to mesh with those gears 41 and 3.

The planet gear carrier 21 is formed integrally with a clutch outer part 82 of the one-way clutch mechanism 8 so that this carrier 21 rotatably supports the planet gears 2 from the left side of the planet gears 2. On the other hand, the planet gears 2 are rotatably supported on the boss 62 attached to the input shaft (that is, crank-shaft) 6 as mentioned above, so that the input shaft (that is, crank-shaft) 6, the boss 62, the planet gears 2, the planet gear carrier 21 and the clutch outer part 82 of the clutch integrally rotate about an input rotation axis.

In addition, an electromagnetic powder brake 50 is disposed on the outer circumferential portion of the internal gear 3. This electromagnetic powder brake 50 is constituted by a brake member 51 integrally formed on the outside portion of the internal gear 3, a brake body 52 disposed on the stationary portion, powder (magnetic particles) provided in a space surrounded by the brake member 51 and the brake body 52, and an excitation coil 54 disposed on the brake body 52. The electromagnetic powder brake 50 has such a function that when a current is made to flow into this excitation coil 54, the coil 54 excites and solidifies the power (magnetic particles) to thereby connect the brake body 52 to the brake member 51 through the frictional force.

In addition, a plurality of fins 51a are provided on the outer circumferential portion of the brake member 51 so as to efficiently release heat which is necessarily generated in principle, to thereby maintain the quality of the power (magnetic particles).

The brake body 52 of the electromagnetic powder brake 50 is fixed to the casing 61 of the engine and rotatably supports the internal gear 3 through the bearings 53 from the outer circumference of the internal gear 3.

Figure 2A:
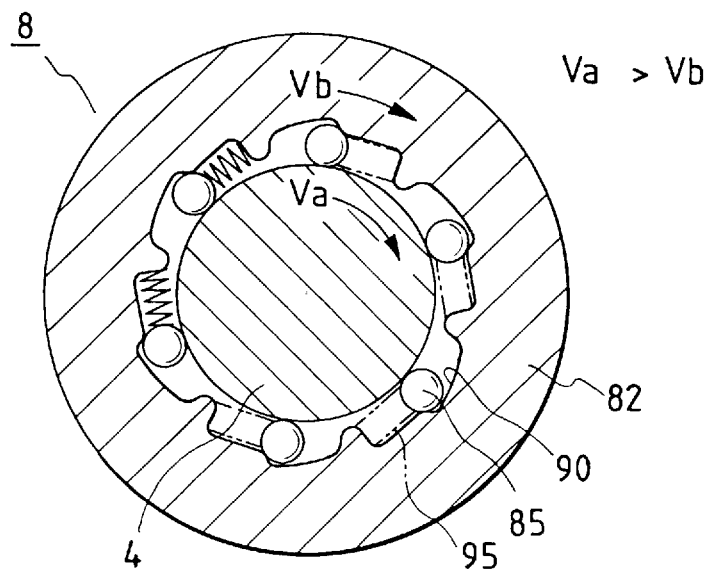
Figure 2B:
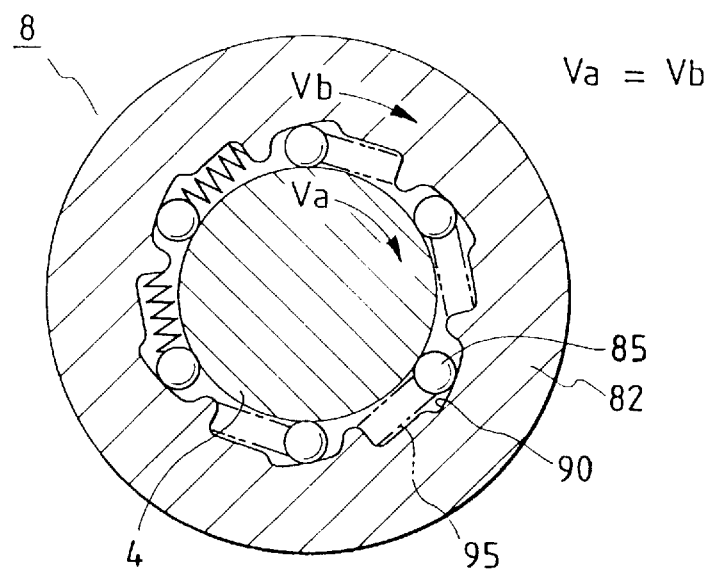

FIGS. 2A and 2B are diagrams illustrating a section (taken in line 2A,2B—2A,2B in FIG. 1) of the one-way clutch mechanism 8. The one-way clutch mechanism 8 is constituted by the above-mentioned clutch outer part 82 formed integrally with the planet gear carrier 21, the output shaft 4 which acts as a clutch inner part, and a plurality of engagement members (that is, rollers) 85 disposed between the clutch outer part 82 and the clutch inner part (output shaft) 4. The engagement members (rollers) 85 acts to transmit the rotation of the clutch outer part 82 to the output shaft 4 which is the clutch inner part. The inside surface of the clutch outer part 82 has engagement surfaces for accommodating the engagement members 85, and for engagement with the engagement members 85 to perform a wedge action when the clutch outer part 82 is rotated in one direction relative to the clutch inner 4. In addition, spring members 95 are provided between the respective engagement members 85 and the clutch outer part 82 so that the engagement members 85 are urged elastically in the direction opposite to the rotation.

Next, the operation of the aforementioned auxiliary machine driving apparatus will be described.

First, in the case where the engine rotates at a low velocity (that is, the input shaft or crank-shaft 6 rotates at a low velocity), the excitation coil 54 of the brake body 52 of the electromagnetic powder brake 50 is supplied with a current so as to excite and solidify the powder (that is, magnetic particles), to thereby couple the brake member 51 with the brake body 52 to bring the brake member 51 into a fixed state. Therefore, the internal gear 3 integrated with the brake member 51 does not rotate and is put in a fixed state.

By the rotation of the input shaft (crank-shaft) 6, the planet gears 2, the outer circumferences of which mesh with the internal gear 3 thus fixed, revolve around the rotation shaft of the input shaft (crank-shaft) 6 within the internal gear 3, which, in turn, rotate the sun gear 41 on the inner circumferential side of the planet gears 2, that is, rotate the output shaft 4 at an accelerated rotation velocity.

In this case, as shown in FIG. 2A, the carrier 21 and the clutch outer part 82 integrated with the input shaft (crank-shaft) 6 rotate at the same velocity Vb together with the input shaft (crank-shaft) 6. However, since the output shaft 4 which is a clutch inner part is rotating at an accelerated rotation velocity Va (Va>Vb), the engagement members 85 in the one-way clutch mechanism 8 are driven toward the wider side of the wedged spaces against the elastic members 95 so that the engagement of the clutch is released. As a result, the clutch outer part 82 and the output shaft 4 rotate at velocities different from each other in this state.

Next, when the engine rotation velocity is increased so that the rotation velocity of the input shaft (crank-shaft) 6 reaches a predetermined value of Nx, the current of the excitation coil 54 of the electromagnetic powder brake 50 is reduced gradually so that the solidification of the excited powder (magnetic particles) is weakened and the brake member 51 is brought into a release state from the brake body gradually. Therefore, the internal gear 3 integrated with the brake member 51 is also brought into a movable state so that the acceleration effect of the planet gears 2 and the sun gear 41 becomes weak gradually. As a result, the state of the output shaft 4 is changed from an accelerated state to a uniform velocity state wherein the output shaft 4 rotates at velocity equal to that of the input shaft 6.

That is, as shown in FIG. 2B, the rotation velocity Vb of the clutch outer part 82 becomes equal to the rotation velocity Va of the output shaft 4 which is a clutch inner part so that the one-way clutch mechanism 8 is gradually brought into an actuated or connected state. After that, when the engine rotates at a high velocity, the input shaft 6 (crank-shaft), the carrier 21 and the output shaft 4 rotate at a uniform velocity.

Figure 3:
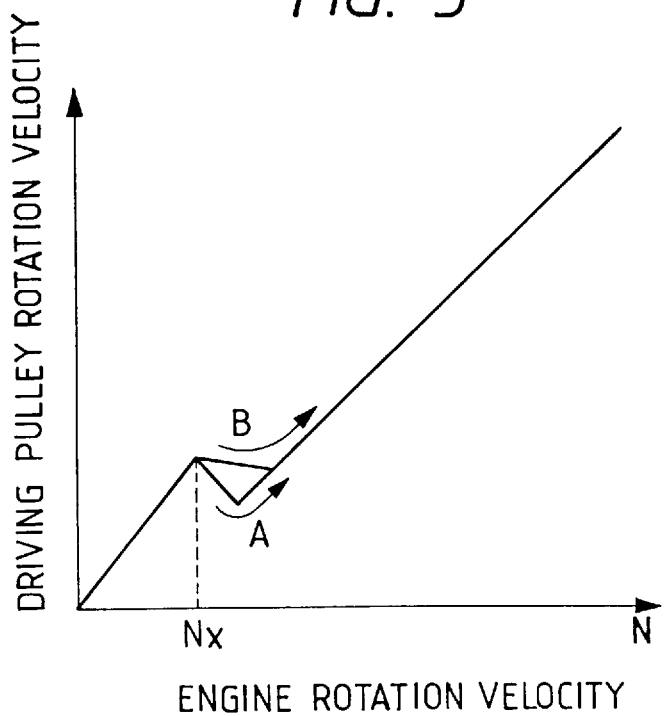
FIG. 3 is a graph illustrating the relationship between the engine rotation velocity and the alternator rotation velocity when an auxiliary machine driven by the auxiliary machine driving apparatus shown in FIG. 1 is an alternator.
Figure 7:
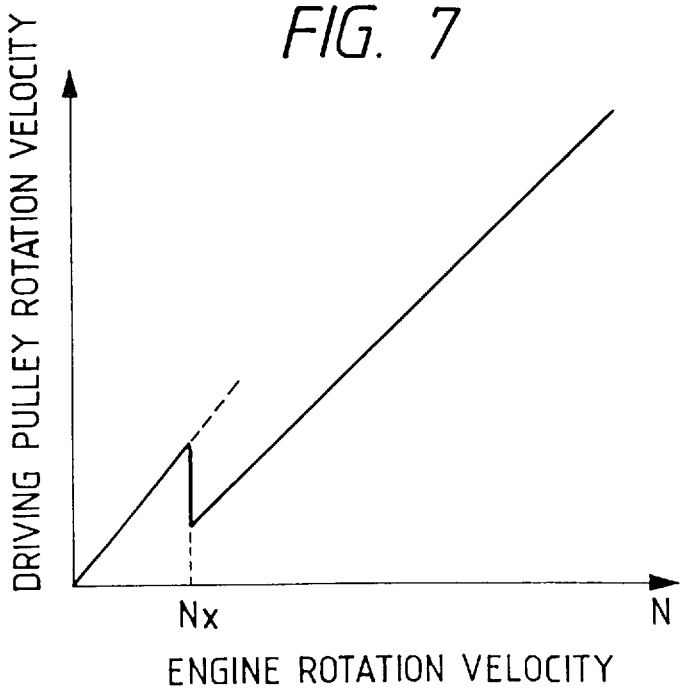
FIG. 7 is a graph illustrating the relationship between the engine rotation velocity and the alternator rotation velocity when an auxiliary machine driven by the conventional auxiliary machine driving apparatus is an alternator.

FIG. 3 shows the rotation transmitting characteristic of the auxiliary machine driving apparatus according to this embodiment, illustrating the relationship between the rotation velocity of the engine as the input side and the rotation velocity of the driving pulley as the output side.

In FIG. 3, when the engine rotation velocity reaches the predetermined value of Nx, a current to be supplied to the excitation coil 54 of the electromagnetic powder brake 50 is adjusted. That is, the shifting between the acceleration mode and the uniform velocity mode can be adjusted in accordance with the rate of decrease of the current, for example, as shown by A or B in the curve. That is, A shows the case where the decrease of the current is effected sharply, while B shows the case where the decrease of the current is effected gently.

The control mode of the auxiliary machine driving apparatus by means of the coil current of the electromagnetic powder brake will be described below in detail.

Figure 4:
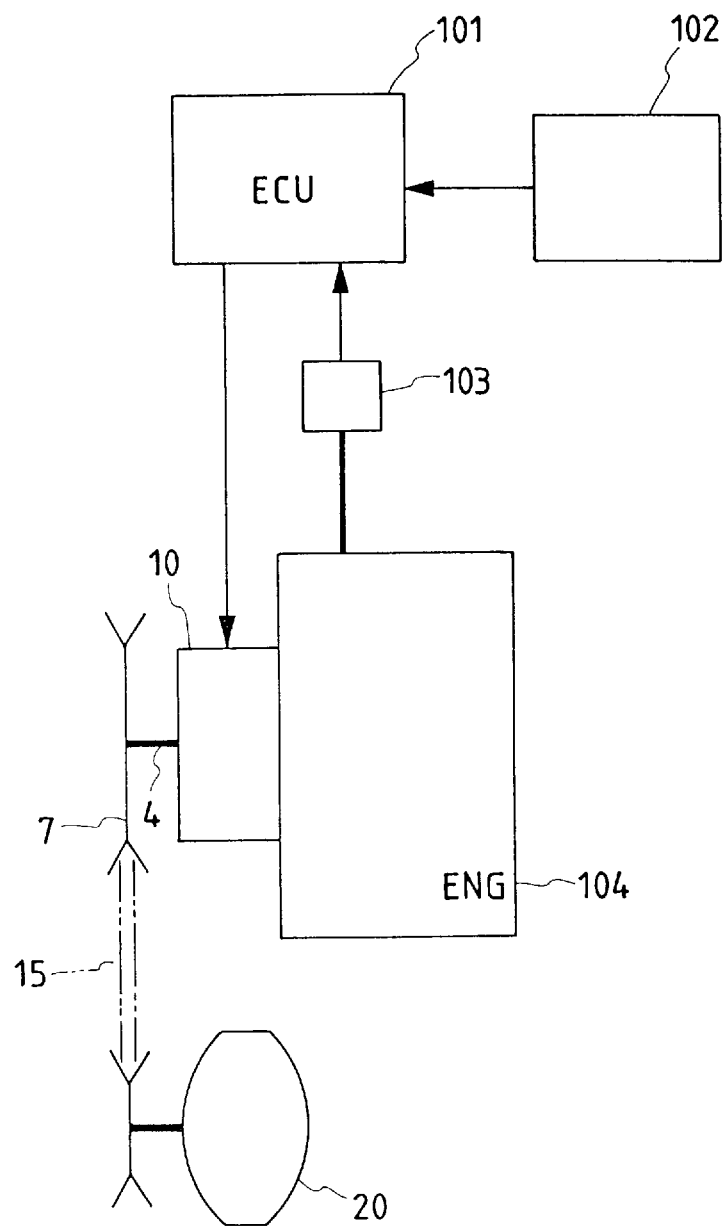
FIG. 4 is a block diagram illustrating a controller of the auxiliary machine driving apparatus in the embodiment 1.

FIG. 4 shows a structure example illustrating a controller for realizing the control mode. In FIG. 4, a crank-shaft of an engine 104 is disposed as an input shaft of an auxiliary machine driving apparatus 10 directly, and a crank pulley 7 is provided on an output shaft 4 of the auxiliary machine driving apparatus 10. A driving belt 15 for transmitting a driving force to an auxiliary machine 20, such as an alternator or the like, is suspended on this crank pulley 7. An ECU (Engine Control Unit) 101 is an operational portion for performing various controls of the engine. Limiting to this embodiment, the ECU 101 is supplied with detection values from an engine rotation velocity detection sensor 103 for detecting the rotation velocity of the engine 104 and an acceleration/ deceleration detection sensor 102 for detecting the acceleration/ deceleration state of a vehicle or the like, and acts to determine a current to be supplied to an excitation coil 54 of an electromagnetic powder brake 50 of the auxiliary machine driving apparatus 10.

Next, the control operation in FIG. 4 will be described with reference to FIGS. 5A–5C.

First, the ECU 101 detects engine rotation velocity N and acceleration/deceleration state by means of the engine rotation velocity detection sensor 103 and the acceleration/ deceleration detection sensor 102.

Figure 5A:
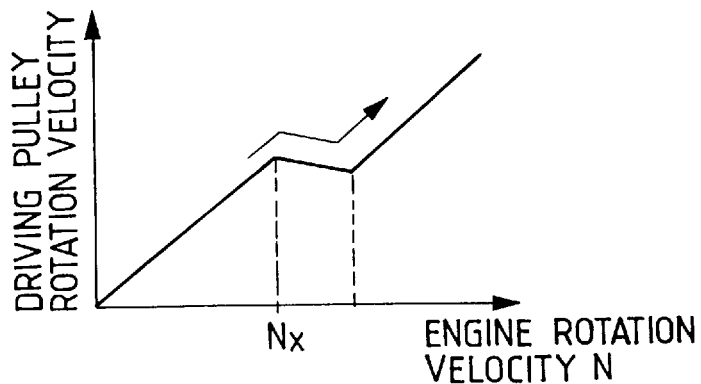
FIGS. 5A, 5B and 5C are graphs illustrating a control example of the auxiliary machine driving apparatus in the embodiment 1.
Figure 5B:
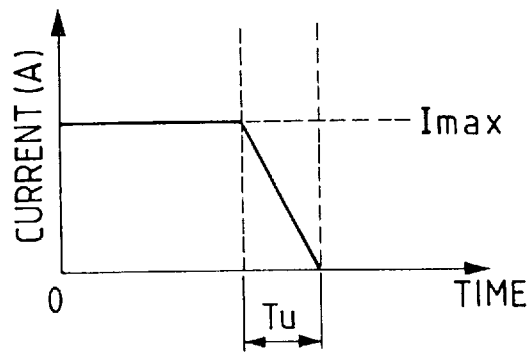

(1) In an acceleration state, as shown in FIGS. 5A and 5B, a current to be supplied to the excitation coil 54 of the electromagnetic powder brake 50 is made to be Imax (A) so as to bring the internal gear 3 into a perfectly fixed state in a period where the engine rotation velocity N is in a range of from 0 to Nx (r.p.m.). At this time, the driving pulley 7 rotates in the acceleration mode. When the engine rotation velocity reaches Nx (r.p.m.) or more, the current to be supplied to the excitation coil 54 is gradually reduced from Imax (A) to 0 in a period of time Tu. At this time, if the ECU 101 detects a sudden acceleration state on the basis of the output value detected by the acceleration/ deceleration detection sensor 102, the ECU 101 makes adjustment to shorten the period of time Tu taken for gradually reducing the current supplied to excitation coil.

(2) Next, in a deceleration state, the current to be supplied to the excitation coil 54 of the electromagnetic powder brake 50 is made 0 to bring the internal gear 3 into a free state until the engine rotation velocity N reaches Ny (r.p.m.). At this time, the driving pulley 7 rotates in a uniform velocity mode. When the engine rotation velocity becomes Ny (r.p.m.) or less, the current to be supplied to the excitation coil 54 is increased from 0 to Imax (A) in a period of time Td. At this time, when the ECU 101 detects a sudden deceleration state on the basis of the output value detected by the acceleration/ deceleration detection sensor 102, the ECU 101 makes adjustment to shorten the period of time Td taken for gradually reducing the current supplied to the excitation coil.

Figure 5C:
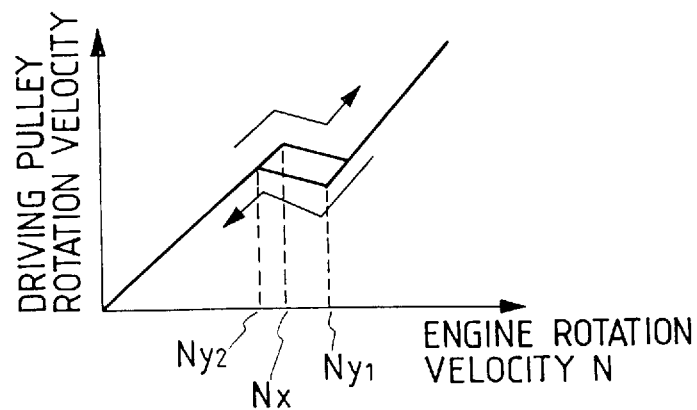
Figure 6:
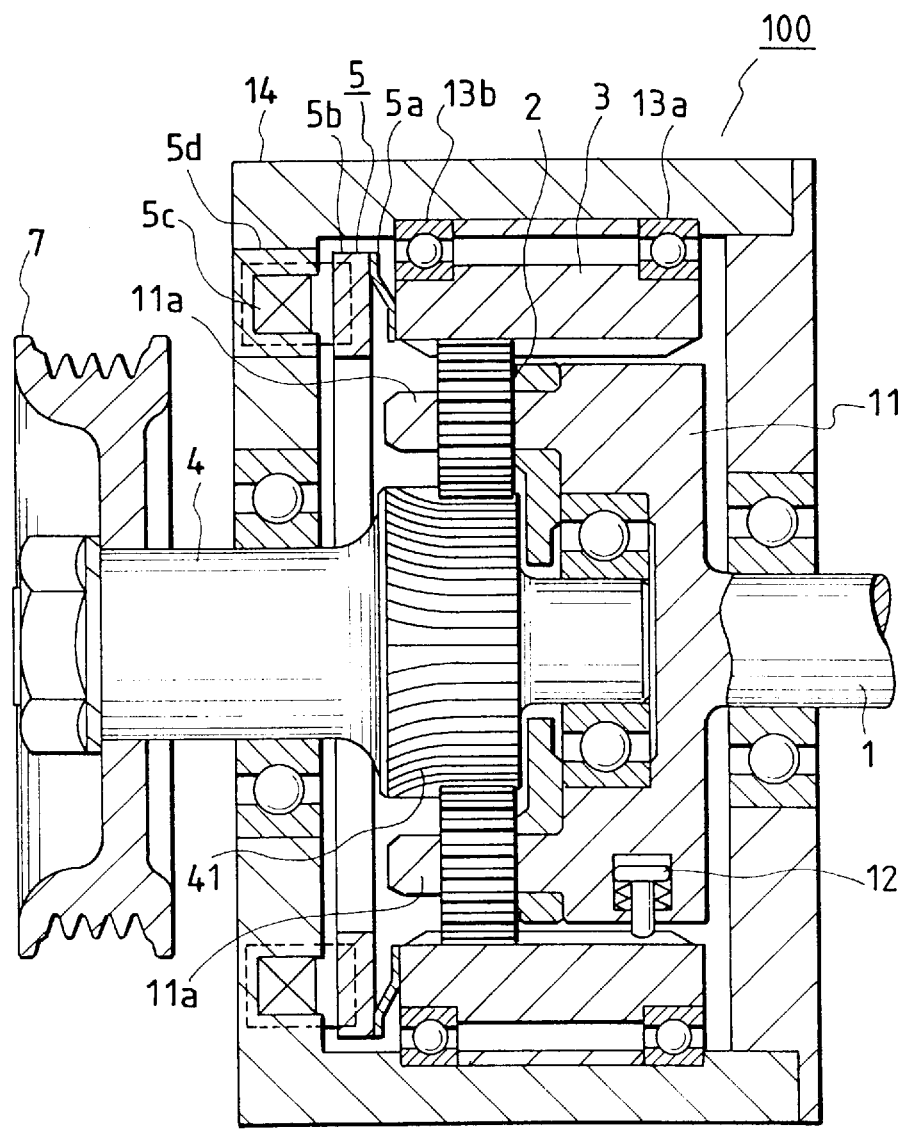
FIG. 6 is a sectional view of a conventional auxiliary machine driving apparatus.

That is, in the deceleration state, as shown in FIG. 5C, it will go well if the current to be supplied to the excitation coil 54 is increased gradually from 0 to Imax (A) only when the engine rotation velocity N is in a range of from Ny1 to Ny2 (Ny1>Ny2).

As mentioned above, it is possible to perform the control in various manners by the determination and combination of the values of Tu, Td, Nx and Ny when the excitation coil current is to be reduced and increased gradually.

As has been described above, according to this embodiment, the electromagnetic powder brake 50 is used as means for connecting/ disconnecting the internal gear 3 to/from the stationary portion, and the value of a current to be supplied to the excitation coil 54 of the electromagnetic powder brake 50 is controlled, so that the connecting/ disconnecting force can be adjusted. Accordingly, it is possible to perform the velocity change-over smoothly between an acceleration mode and a uniform velocity mode between the input shaft (crank shaft) 6 and the output shaft 4, and therefore it is possible to relieve a shock at the time of the velocity change-over.

In addition, there are provided the one-way clutch mechanism 8 constituted by the clutch outer part 82 formed integrally with the planet gear carrier 21, the output shaft 4 which acts as the clutch inner part, and the plurality of engagement members (rollers) 85 disposed between the clutch outer part 82 and the output shaft 4. Accordingly, the change of the rotation velocity of the input shaft (crank-shaft) 6, i.e. the change of the rotation velocity of the engine is not transmitted directly to the output shaft 4 so that it is possible to reduce the adverse influence to the auxiliary machine and the belt for transmitting power to the auxiliary machine.

Further, because the crank-shaft of the engine is directly connected, as the input shaft 6, to the auxiliary machine driving apparatus, there is an advantage that the apparatus can be made compact in comparison with a conventional one.

In addition, because the value of a current to be supplied to the excitation coil 54 of the electromagnetic powder brake 50 is adjusted in accordance with the rotation velocity of the engine and the acceleration/deceleration state of the engine, it is possible to perform the change-over between a uniform velocity mode and an acceleration mode more smoothly.

As has been described above, according to the present invention, for example, an electromagnetic powder brake is used as means for connecting/disconnecting the internal gear to/from the stationary portion so that the connecting/disconnecting force can be adjusted. It is therefore possible to changeover the velocity from an acceleration mode to a uniform velocity mode, and it is possible to relieve a shock at the time of changing-over the velocity.

In addition, a unidirectional rotation transmitting means (unidirectional clutch mechanism) is provided so that the change of the rotation velocity of the input shaft 6 (the change of the rotation velocity of the engine) is not transmitted directly to the output shaft. It is therefore possible to reduce the influence to the auxiliary machine and the belt for transmitting power to the auxiliary machine.

Further, because the crank-shaft of the engine is directly connected, as the input shaft, to the auxiliarymachine driving apparatus, it is possible to make the apparatus compact as a whole.

In addition, because the connecting/disconnecting force of the coupling/releasing means is adjusted in accordance with the rotation velocity of the engine and the acceleration/deceleration state of the engine, it is possible to perform the change-over between a uniform velocity mode and an acceleration mode.

What is claimed is:

1. An auxiliary machine driving apparatus comprising:
   a carrier connected to an input shaft;
   a plurality of planet gears rotatably supported on said carrier;
   an internal gear meshing with outer circumferences of said planet gears and rotatably supported on a stationary portion;
   a connection/disconnection means for connecting/disconnecting said internal gear to/from said stationary portion and adjusting a connecting/disconnecting force between said internal gear and said stationary portion;
   an output shaft having a sun gear meshing with inner circumferences of said planet gears and rotatable relative to said stationary portion; and
   a unidirectional rotation transmitting means for permitting said carrier to transmit unidirectional rotation to said output shaft.

2. An auxiliary machine driving apparatus according to claim 1, wherein said input shaft is connected to a crank-shaft of an internal combustion engine.

3. An auxiliary machine driving apparatus according to claim 1, wherein a connecting/disconnecting force of said connection/disconnection means is adjusted in accordance with rotation velocity of said input shaft and acceleration/deceleration state of said input shaft.

4. An auxiliary machine drive apparatus according to claim 1, wherein said connection/disconnection means includes an electromagnetic powder brake capable of varying a connection force depending on magnitude of current supplied thereto.

5. An auxiliary machine drive apparatus according to claim 1, wherein said unidirectional rotation transmitting means comprises a one-way clutch interposed between said carrier and said output shaft.

6. An auxiliary machine drive apparatus according to claim 1, wherein when said internal gear is disconnected from said stationary member, rotation said input shaft is transmitted to said output shaft through said carrier and said unidirectional rotation transmitting means.

7. An auxiliary machine drive apparatus according to claim 6, wherein when said internal gear is connected to said stationary member, rotation of said input shaft is transmitted to said output shaft through said carrier, said planet gears and said sun gear in this order.

* * * * *